US006964161B2

(12) United States Patent
Campbell

(10) Patent No.: US 6,964,161 B2
(45) Date of Patent: Nov. 15, 2005

(54) INDUCTION EXHAUST SYSTEM

(76) Inventor: Monty Allen Campbell, 6745 Mesada St., Alta Loma, CA (US) 91701

( * ) Notice: Subject to any disclaimer, the term of this patent is extended or adjusted under 35 U.S.C. 154(b) by 0 days.

(21) Appl. No.: 10/260,860

(22) Filed: Sep. 30, 2002

(65) Prior Publication Data
US 2004/0060287 A1 Apr. 1, 2004

(51) Int. Cl.$^7$ ............................................. F01N 3/10
(52) U.S. Cl. ..................... 60/308; 60/278; 60/279; 60/287; 60/288; 60/305; 60/312; 60/322; 123/568.14; 123/568.15; 123/568.22
(58) Field of Search ........................ 60/278, 279, 281, 60/287, 302, 305, 307, 308, 312, 313, 317, 60/319, 318, 322, 323, 288; 123/295, 430, 123/568.13, 568.14, 568.15, 568.22

(56) References Cited

U.S. PATENT DOCUMENTS

| | | | |
|---|---|---|---|
| 4,800,719 A | 1/1989 | Campbell | |
| 4,953,352 A | 9/1990 | Campbell | |
| 4,958,490 A * | 9/1990 | Harjunpaa | 60/274 |
| 5,293,741 A * | 3/1994 | Kashiyama et al. | 60/284 |
| 5,303,686 A * | 4/1994 | Kanesaka | 123/568.14 |
| 6,427,436 B1 * | 8/2002 | Allansson et al. | 60/274 |
| 6,553,959 B2 * | 4/2003 | Xu et al. | 123/295 |

* cited by examiner

Primary Examiner—Binh Q. Tran

(57) ABSTRACT

A induction exhaust system, for an internal combustion engine, capable of the multi step processes of 1) scavenging the chamber of exhaust gases and free radicals, 2) breaking the scavenge vacuum wave behind each energetic exhaust pulse, releasing said free radicals and the overscavenged air fuel vacuumed from the intake manifold during valve overlap, and 3) induction of such free radicals, unburned fuel, and fresh matter including atmospheric air. Such multi step process 1) relatively improves the fuel efficiency of such engines by reducing the wasted potential energy normally expelled by exhaust systems; unburned fuel, sound pressure energy, waste heat energy, energy rich free radicals formed by incomplete combustion, and energy rich catalytic converter products rich in potential energy that can be further combusted via induction, 2) increases catalytic converter efficiency by forcing unburned air fuel and free radicals to make multiple passes through such converter, thereby increasing residency time, 3) reduces emissions of undesirable compounds and free radicals via induction, 4) improves relative effective octane rating of fuel used by creating a unique composition of matter that acts to refract and reflect sonic detonation shock waves, disrupting and disbursing them, reducing detonation, thereby improving combustion efficiency, and 5) allows a new means to direct combustion process products and/or remove undesirable products, and/or introduce desirable matter into a combustion chamber, allowing further alteration of such unique composition of matter layered on top of such engine's prime mover combustion surface, and 6)including an adaptive means to dynamically optimize its function.

29 Claims, 10 Drawing Sheets

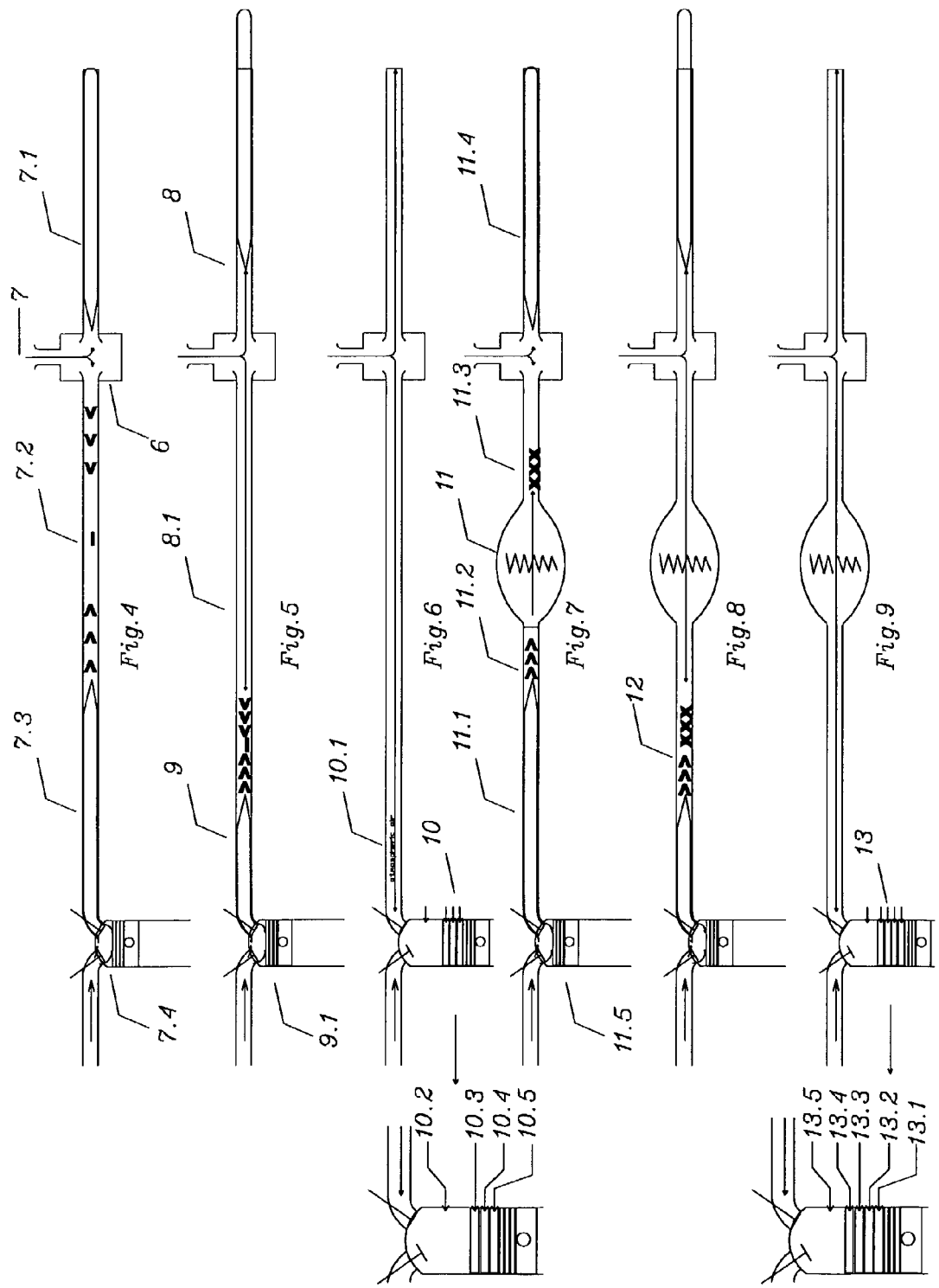

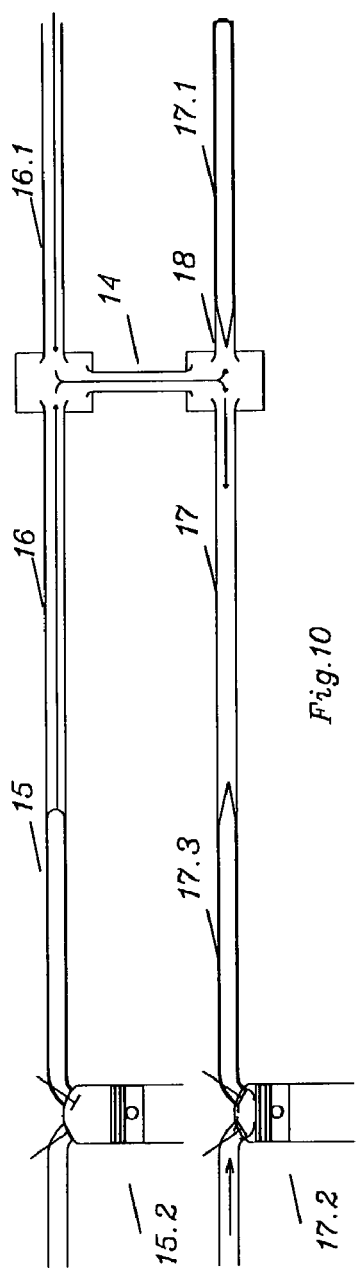
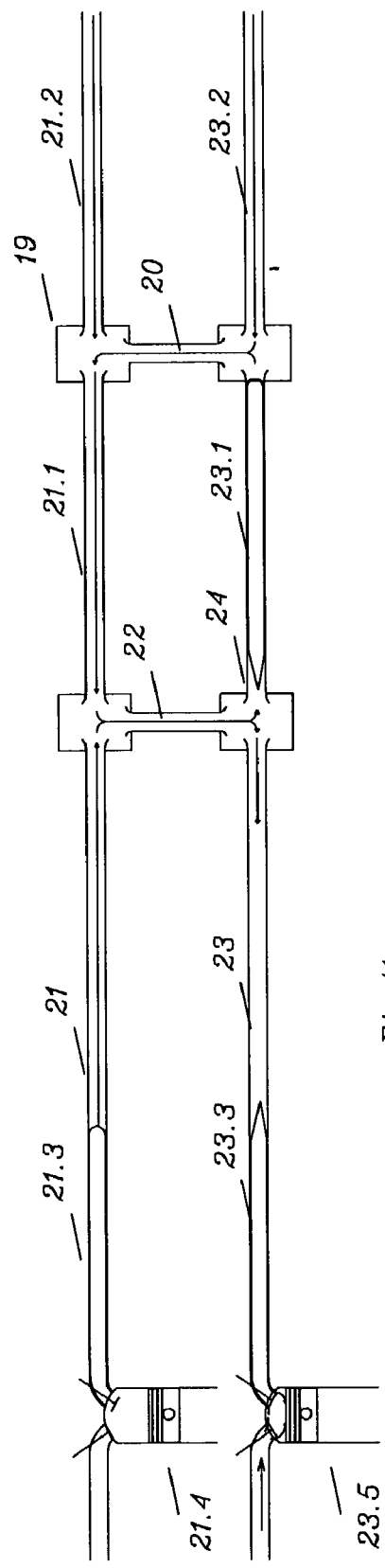

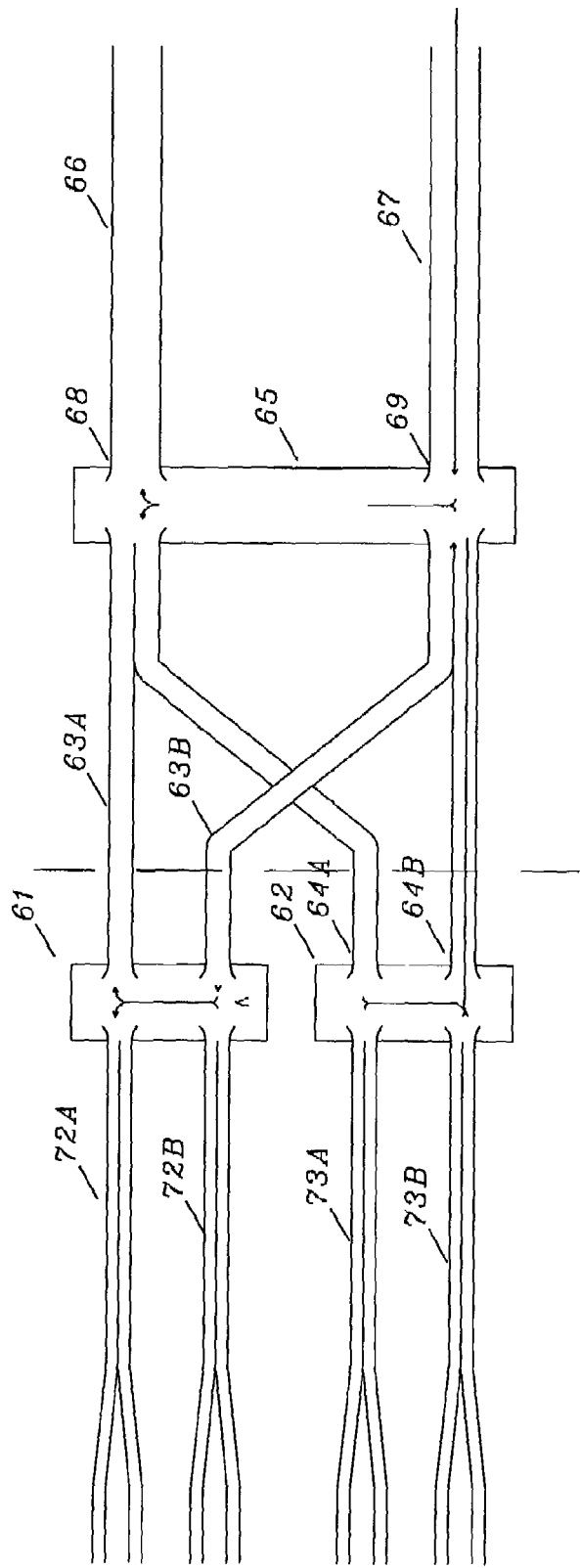

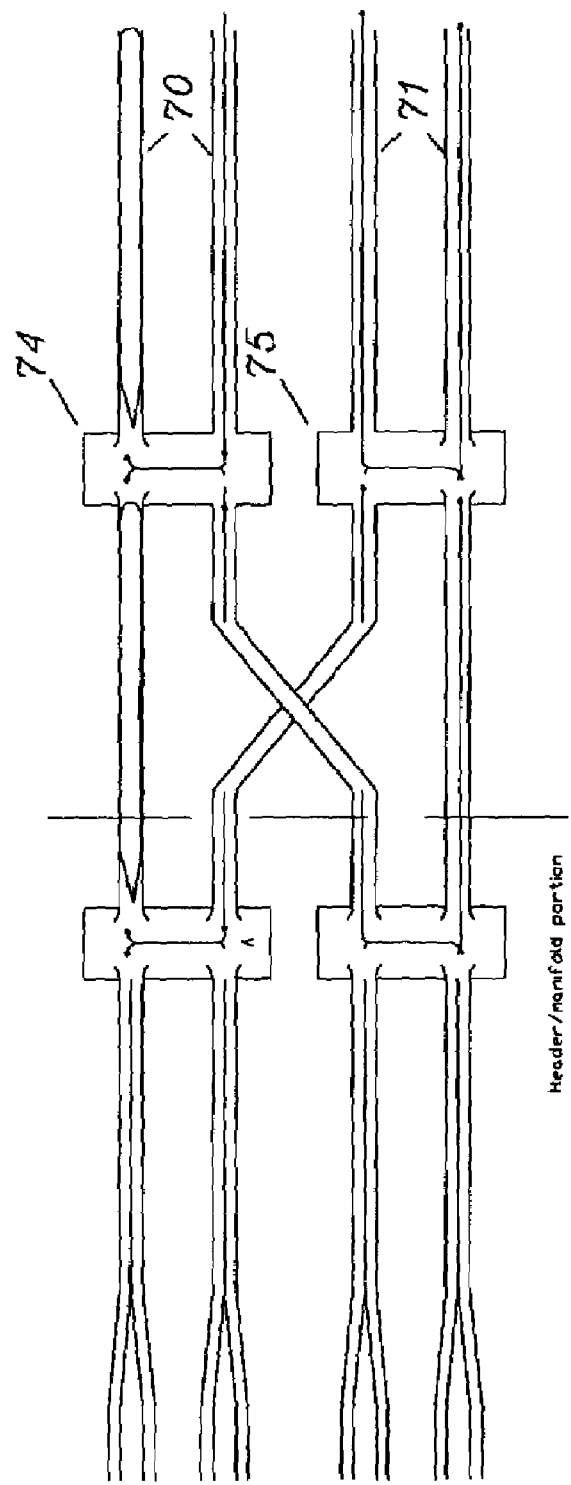

INDUCTION EXHAUST SYSTEM

CROSS REFERENCE TO RELATED APPLICATIONS

None.

STATEMENT REGARDING FEDERAL SPONSORED R & D

None.

REFERENCE TO SEQUENCE LISTING

None.

BACKGROUND OF THE INVENTION

1. Technical Field

This invention relates generally to exhaust systems for internal combustion engines.

2. Description of Related Art

In the early days of exhaust development, when flat head engines were common, scavenge resonant exhaust systems helped to remove residual exhaust gases from the combustion chamber & helped to initiate intake flow into the combustion chamber. Scavenge has evolved into expanding tube extractors, anti-reversion mufflers and structures to prevent loss of scavenge vacuum at low rpms. During this time, cylinder head design has evolved from flat heads to overhead designs incorporating three, four, five and even eight valve per cylinder designs. Combining state of the art scavenge technology with state of the art head designs creates "overscavenge;" a situation where raw, unburned air fuel is swept through the combustion chamber during valve overlap, and out of the tail pipe. Horsepower is lost due to reduced dynamic cylinder pressure. Fuel economy is lost due to the quantity of fuel and free radicals left unburned. Emissions increase as unburned matter is vacuumed out of the engine into the atmosphere. Catalytic converters were added in 1975 to incinerate such unburned products; restricting flow while emitting cyanide (CN—) compounds.

BRIEF SUMMARY OF THE INVENTION

Therefore the objects of the present invention are as follows: to provide an induction exhaust system for an internal combustion engine which improves the thermal-mechanical conversion efficiency of the engine over conventional exhaust systems by; creating precisely timed events; 1) a scavenge event (where exhaust gasses are removed from cylinders of the engine), 2) a vacuum break event (to stop overscavenging of unburned air fuel), and 3) a pressure event wherein energetic free radicals, unburned air fuel and other desired matter are inducted via the engine's exhaust port. Such timed events increase engine efficiency and reduce fuel consumption and emissions.

BRIEF DESCRIPTION OF THE DRAWINGS

The features, objectives, and advantages of the preferred embodiment of the invention will become more apparent from the detailed description set forth below when taken in conjunction with the drawings wherein like parts are identified with like reference numerals throughout, and wherein:

FIG. 4 demonstrates how an induction exhaust system uses a vacuum break chamber 6, during valve overlap period 7.4, which allows air 7, to flow into the vacuum region 7.2 behind said exhaust pulse 7.1.

FIG. 5 follows FIG. 4, and demonstrates how atmospheric air pressure entering behind said exhaust pulse 8, tends to push overscavenge 9, back into said engine exhaust port 9.1, and tends to reduce the vacuum drag upon said pulse 8, allowing it to travel more easily out of the system.

FIG. 6 follows FIG. 5, and demonstrates how an induction exhaust system uses inward flowing atmospheric air 10.1 to create a unique form of matter that is applied more or less in layers upon the top surface of the piston 10, allowing such energy contained in unburned air fuel overscavenge 10.5, free radicals 10.4, atmospheric air 10.3, and fresh air fuel from the intake tract 10.2, to be burned, some of it for the second time, in such engine's subsequent combustion (power) stroke.

FIG. 7 shows how a catalytic converter 11 could be placed in such induction exhaust system. As exhaust pulse 11.4 scavenges free radicals 11.2 and unburned air fuel overscavenge 11.1 through converter 11, such free radicals and unburned air fuel are catalytically converted into cyanide compounds (HCN & CN—R) 11.3.

FIG. 8 follows FIG. 7 and shows how energy rich catalytic converter products and overscavenge 12, are inducted into cylinder 11.5.

FIG. 9 follows FIG. 8 and shows the unique composition of matter 13, created by such induction exhaust system when a catalytic converter is added between such engine and such vacuum break chamber. Such matter is composed of unburned air fuel overscavenge 13.1, free radicals 13.2, Cyanide compounds 13.3, atmospheric air 13.4, and fresh air fuel from the intake tract 13.5, to be burned, some of it for the second time, in such engine's subsequent combustion (power) stroke.

FIG. 10 shows how herein described induction exhaust can be applied two, or more, cylinders. Cylinders 15.2 and 17.2 are connected with a common vacuum break junction 14, which further conserves energy by using rapidly existing exhaust pulse 15, creating column pressure 16 to pressurize and flow through vacuum break passage 14 to form a pressure to more effectively force induction 17 of overscavenge 17.3 into a earlier timed scavenge wave 18, while pushing behind such earlier exhaust pulse 17.1. Such combined system tends to offset the slowing effects of compression wave 16 on an exiting exhaust pulse 17.1 by later relatively helping to push 18 the exhaust pulse 17.1 out of the system as it leaves the system. Such induction exhaust system flip flops in operation, using normally wasted exhaust pulse energy to force induction of overscavenge while conserving energy by forcing expulsion of a more advanced exhaust pulse in such system.

FIG. 11 shows how a booster chambers 19 & 20, can further circulate compressed air energy 20 and 21, returning such pressure flow through such vacuum break chamber 22 and tube 23, to more forcefully induct overscavenge 23.3, while more forcefully 24 ejecting exhaust pulse 23.1. Compression energy drag at 20, on exhaust pulse 23.1, is almost equal to expansion energy push expended at 24. So, even though less matter is expelled at 21.2 & 23.2, due to induction of overscavenge, exhaust pulse are not slowed down to any great degree. Therefor, more exhaust pulses can reside in a given physical sized induction system, without creating excessive back pressure to outward exhaust flow.

Figure 18:
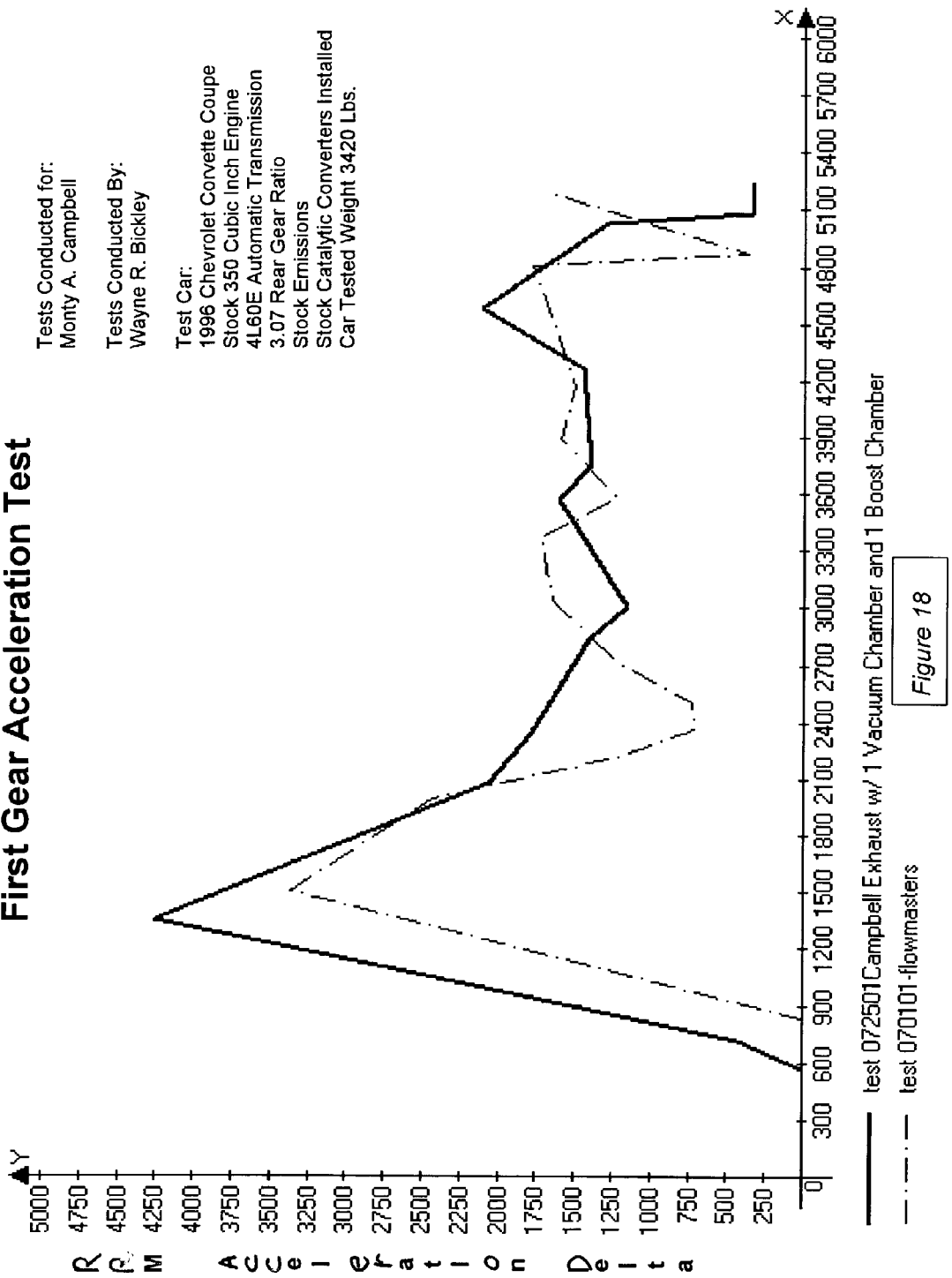
FIG. 18 shows a comparison chart between a nationally recognized performance muffler system versus the herein described induction exhaust design depicted by FIG. 11. The chart's horizontal axis is scaled in engine rpm. Its vertical axis is scaled in rate of change of engine rpm per 0.2 second. Both tests were performed on a stock 1996 Corvette with stock emissions controls and two catalytic converters.

Such mufflers are a patented, anti reversion (scavenge) design. So, this comparison is more meaningful than just comparing an ordinary Corvette brand muffler exhaust. This comparison is scavenge versus induction. The herein described induction exhaust illustrated in FIG. 18 appears to offer more acceleration than one of the best scavenge exhaust designs, because the herein described induction exhaust system is more efficient than scavenge a only system on a modern engine.

FIG. 19 shows an induction exhaust system wherein the vacuum break chambers 61 & 62 are located in the "header" portion of the exhaust and a single boost chamber 65 is located near the exit of the system.

FIG. 20 shows "header" vacuum break chambers connected to two boost chambers 74 & 75 located near the system exit point.

DETAILED DESCRIPTION OF THE INVENTION

Figure 17:
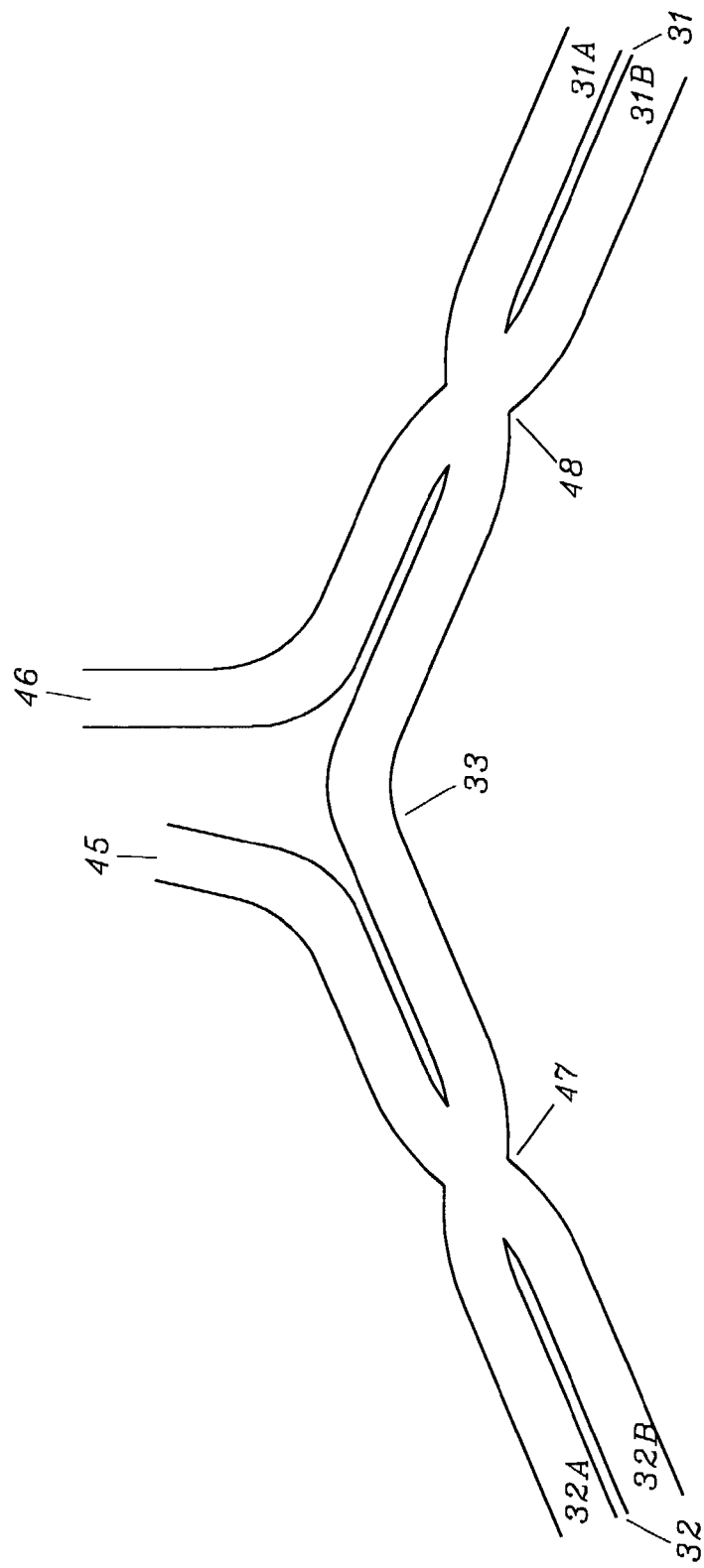
FIG. 17 shows actual product application of FIG. 15. Air break chambers 47 & 48 are installed between engine exhaust port pipes 45 & 46, and twin tuning fork exit pipes assemblies 32 & 31 respectively. In this application four catalytic converters, two each (not shown) are located between pipes 45 & 46, and the engine exhaust ports respectively (not shown).

FIG. 17 is a top plan view showing an induction exhaust system according to the preferred embodiment of the invention. An internal combustion engine (not shown) having at least two sequentially timed cylinders, and at least two exhaust flow manifolds, or collectors, and usually at least two catalytic converters, communicate flow with system inlet pipes 45 & 46 respectively. Upon the arrival of the first exhaust pulse from such engine, it enters inlet pipe 45. Because the exhaust pulse is a very energetic, high temperature mass, released from high cylinder pressures by the operation of the exhaust valve, it reaches a high escape velocity. The exhaust cycle starts with the opening of the exhaust valve, which allows remaining combustion gas thermal energy, cylinder pressure, to be converted into a high kinetic energy gas exhaust pulse column traveling out the exhaust port, into herein described induction exhaust system. Such, first exhaust pulse enters such induction exhaust at tube 45 and travels across air break 47, into exhaust pipe 32B. Said exhaust pulse can not make the sharp turn to exit exhaust 32A because of its mass and resulting momentum. Behind said exhaust pulse is a rarified region created by the high exit velocity of the exhaust pulse, which acts more like a mud ball than a gas stream. Said rarified region, long recognized and utilized in common scavenge exhausts, tends to pull residual, less energetic gases from the engine's combustion chamber. Upon the opening of the intake valve, beginning the intake stroke, a valve 'overlap" period begins, which typically lasts 60 or more degree of crankshaft rotation, that low pressure, scavenge, condition in the combustion chamber immediately sucks higher pressure air fuel from the intake manifold into the combustion chamber. Immediately, that air fuel is sucked out of the combustion chamber into the exhaust port, again due to a still lower pressure created in the exhaust pipe due to the still exiting exhaust gases. As a result, higher pressure seeks lower pressure, and raw air fuel is sucked out the exhaust port into the induction exhaust system, creating "overscavenge."

When the rarefied region, behind the exhaust pulse, enters the vacuum break chamber 47, gases flow from the atmosphere through exhaust system pipe 32A, into vacuum break chamber 47 and continues to flow up pipe 45 toward said engine exhaust port, carrying/pushing overscavenged air fuel back to the engine exhaust port for induction into the combustion chamber as its piston recedes during its intake cycle. This induction via the exhaust port supplements the still flowing air fuel from the intake entering through the intake valve, creating a unique composition of matter on the piston surface as it recedes. The first layer of matter on the piston surface will contain unburned air fuel (from both the intake port and the exhaust port), the second layer will also include free radicals inducted from the exhaust port. The third layer may contain catalytic converter products and atmospheric air inducted from the exhaust port. The final layer will always be air fuel inducted from the intake port (FIG. 6 item 10, and FIG. 9 item 13). The advantages to this unique composition of matter in the combustion chamber are 1) recovery & combustion of otherwise lost energy sources, 2) greater dynamic cylinder pressure yielding a greater thermal-mechanical conversion efficiency, 3) relatively improves octane rating of fuel used by layer interface induced refraction and reflection of detonation shock waves passing through the compressed combustion chamber contents, dissipating the energy of such shock waves, thereby reducing the tendency for unwanted detonation, 4) relatively improves combustion process by placing highly energetic free radicals at the opposite end of combustion chamber from spark plug, allowing combustion to operate from both ends of chamber, 5) allows a leaner air fuel mixture by placing richer mixture closes to spark plug (richer fuel mixtures are easier to spark ignite) and leaner portion (atmospheric air) is farther away from the spark plug, 6) induction of catalytic converter products (HCN & CN—R) allows them to be burned, releasing energy and preventing them from being emitted into the atmosphere, 7) burning all energetic matter available reduces the need to burn more fuel from dwindling fuel reserves, and 8) reduced consumption of fuel reserves reduces production of CO2, CO, and $NO_x$.

At the same time, air is sucked from cross over pipe 33, into vacuum break chamber 47 and out pipe 32B, following said exhaust pulse. As a result of removing air from pipe 33, air is pushed in from pipe 31A & 31B.

Likewise, when a similar exhaust pulse, from the other engine manifold or header, enters pipe 46, it travels across vacuum break chamber 48 and out pipe 31B into the atmosphere. As before, it too is followed by a rarified region and a resulting overscavenge of unburned air fuel removed from its combustion chamber during its overlap period. The higher atmospheric pressure traveling in pipe 31A enters the vacuum break chamber 48, pushing overscavenge back up pipe 46, into said engine exhaust port and chamber as its piston recedes on it intake stroke.

Likewise, atmospheric pressure pushes air into and down pipe 32A, across vacuum break 47, down pipe 33, across vacuum break 48 and out pipe 31B as it follows the exhaust pulse rarified tail portion.

At higher engine rpms the length of pipes 31A & 31B, and 32A & 32B becomes important as they are acoustically coupled and operate to some extent like a common tuning fork. In this way they have a very high "Q" or resonance/couple. Of interest here is that being a conduit of air flow, each pair of pipes actually has not one, but three highly resonant frequencies. Each frequency tends to create standing waves. A standing wave is defined in an open ended tube as a high pressure area at each opening, with a lower pressure area at the center of the pipe length. An acoustically created pressure region that is at the entrance to the vacuum break chamber allows instantaneous pressure forces to more quickly and more forcefully act to return overscavenge to said engine chamber. The three resonant rpms for such a tuning fork outlet can be 2,000, 4,000, and 6,000 rpm for a 8 cylinder engine. These resonant rpms become the approximate power peaks created by the induction exhaust system. Using twin tuning fork outlets allows the three peaks, each, to be slightly broader.

The cross over pipe 33 acts to feed resonance from one pair of tuning fork outlet pipes 31A & 31B to the other 32A & 32B, and visa versa. It also can be used to set up a secondary tone, normally associated with high performance vehicles. Altering its length and diameter allow a selection of exhaust tones to be added to the exhaust sounds, adding pleasure to the driving experience.

Sound pressure, noise, is a sinusoidal wave of alternating regions of high and low pressure waves through air. The induction exhaust system uses such high and low pressure waves to induct overscavenge back into said engine combustion chamber for another attempt at clean, complete combustion. Much of this sound pressure energy is therefore consumed in this induction process, reducing sound levels, in most cases eliminating the need for mufflers, or in the very least, reducing their size.

The induction of overscavenge, raw air fuel, free radicals ($NO_x$, incompletely burned fuel . . . ) allows more of the energy presented to the engine in the form of fuel to be more efficiently burned and converted into mechanical energy. Such induction also reduces emissions of $CO_2$, CO, HC, $NO_x$, HC—R.

Catalytic converters typically convert the targeted emissions of CO & HC into the non-targeted, but even more harmful, emissions of HCN & CN—R. Herein described induction exhaust will induct such cyanide compounds into the combustion chamber for incineration and liberation of their potential energy, thus increasing power while reducing emissions.

The number, or size, of catalytic converters can therefore be reduced when herein described induction exhaust system is used. Many vehicles use two, four, even six converters to increase the "residency time" of the targeted emissions. Because the targeted emissions are much more highly concentrated in the free radical portion of the overscavenge, they are forced to pass through the converters three times by the herein described induction exhaust system. Thus, residency time is tripled. Meaning that it should be possible to get the same conversion efficiency as a three converter system, from a single converter system when used with herein described induction exhaust system.

Figure 1:
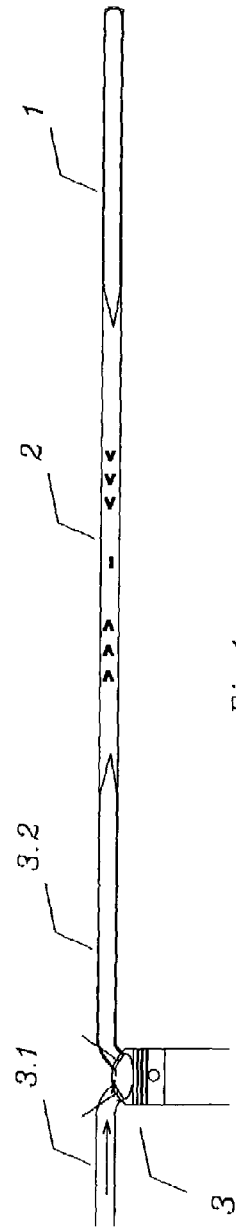
FIG. 1 is a cut away view of an internal combustion engine 3, its intake 3.1 and exhaust manifold 3.2 wherein a high velocity, high temperature exhaust pulse 1 creates a vacuum that draws energized free radicals 2, created when the combustion process is interrupted by the exhaust valve opening event. Such free radicals are, followed by raw unburned air fuel 3.2 drawn out of the intake manifold and through said engine during valve overlap period. Such unburned matter is known collectively as "overscavenge."
Figure 2:
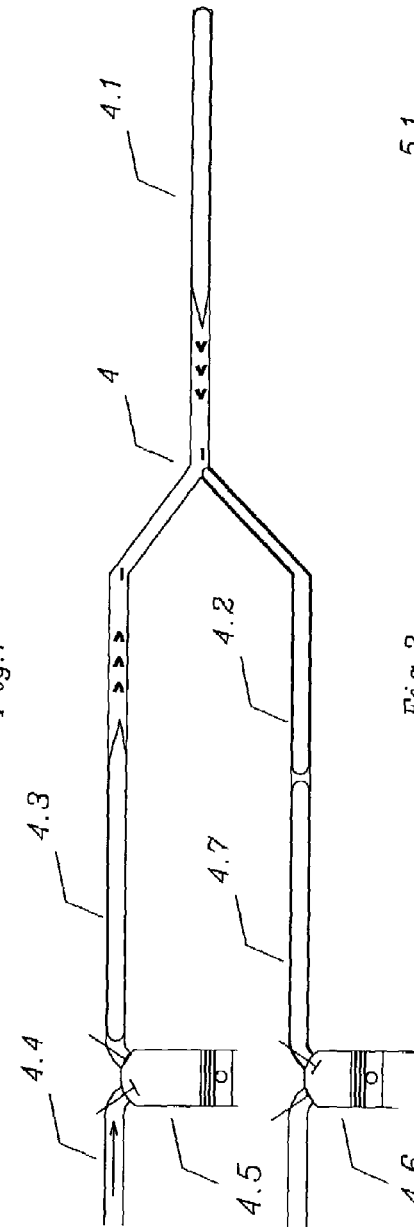
FIG. 2 is a similar cut away view representative of two or more cylinder 4.5 & 4.6 exhaust ports 4.3 & 4.7 connected using a scavenge header 4, allowing the exhaust pulse 4.1 scavenge of the prior cylinder 4.5 to draw upon the exhaust pulse 4.7 of the following cylinder 4.6.
Figure 3:
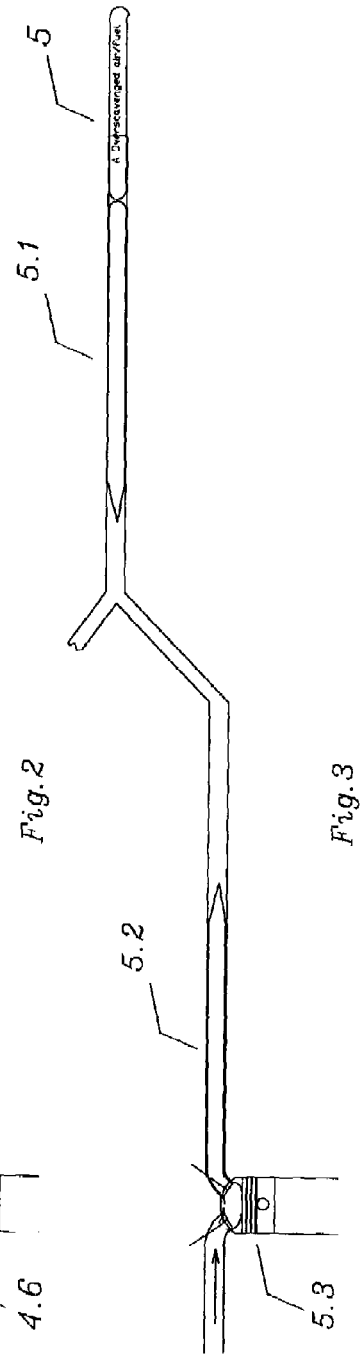
FIG. 3 demonstrates how such scavenge tends to create a stronger, longer duration vacuum that tends to pull a larger volume of free radicals and unburned air fuel 5.2 & 5, which are pushed out of said header 5, by exhaust pulse 5.1, wasting air fuel mixture, and energy remaining in such free radicals. As cylinder head flow design has improved over the years, overscavenge has increased as a result. Headers offer less performance improvement on more modern, high flow cylinder heads and intake systems.
Figure 12:
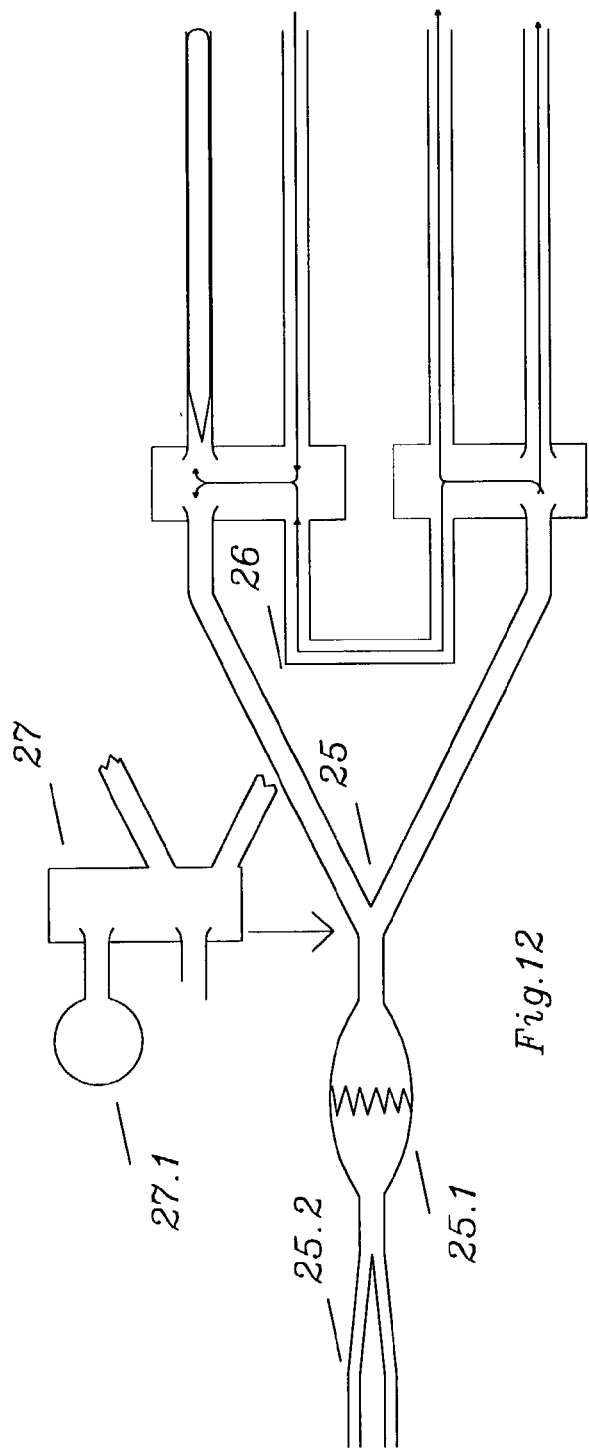
FIG. 12 shows how a multi cylinder engine exhaust 25.2 exiting through a single converter 25.1 can use a "Y" adapter 25 to split the exiting exhaust pulse between two vacuum break chambers flow connected via a tuned cross over tube 26. The "Y" adapter 25 can be replaced with a vacuum break—resonant chamber 27.1 vacuum break assembly 27, allowing the two chambers connected via said tuned cross over tube 26, to become boost chambers.
Figure 13:
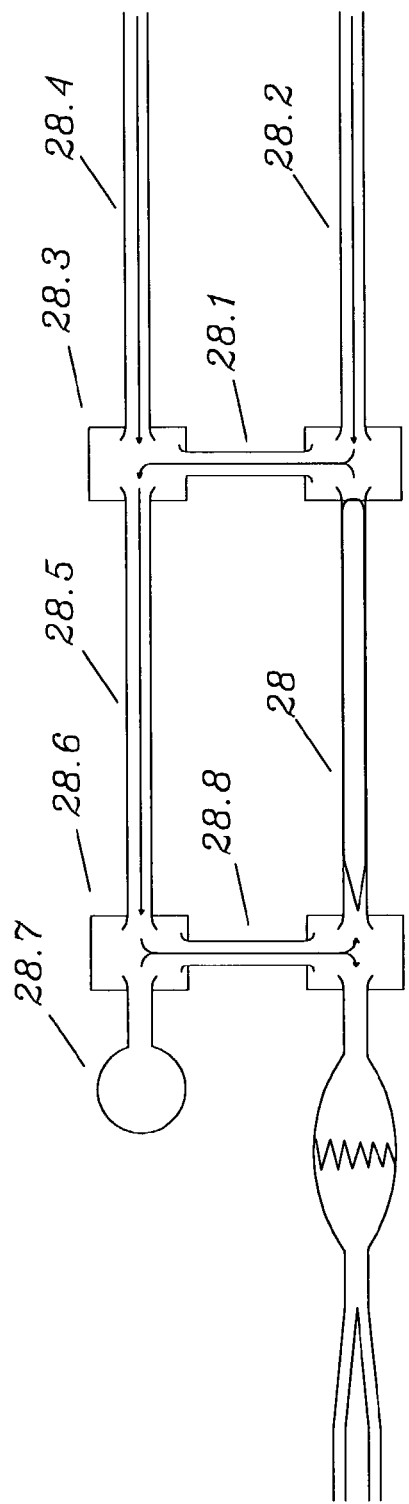
FIG. 13 shows how resonant pressure waves from resonant chamber 28.7 act to create pressure returned to vacuum break chamber to increase induction pressure. When exhaust pulse 28 passes vacuum break chamber 28.6, a pressure wave is created 28.1 pressurizing boost chamber 28.3 passing through 28.5 pressurizing vacuum break chamber 28.6 flowing behind said exhaust pulse 28.8; releasing said exhaust pulse 28 from the compression and rarefaction wave drag in conventional systems, while forcibly inducting overscavenge. Twin outlet tubes 28.4 act as a "tuning fork"-like resonant network that has multiple resonant frequencies, creating standing and traveling waves that tend to block pressure wave loss from boost chamber 28.3. Resonant chamber 28.7 acts to store and release such pressure waves sympathetically, imitating the symmetrical firing order input from two outlet engine manifolds.
Figure 14:
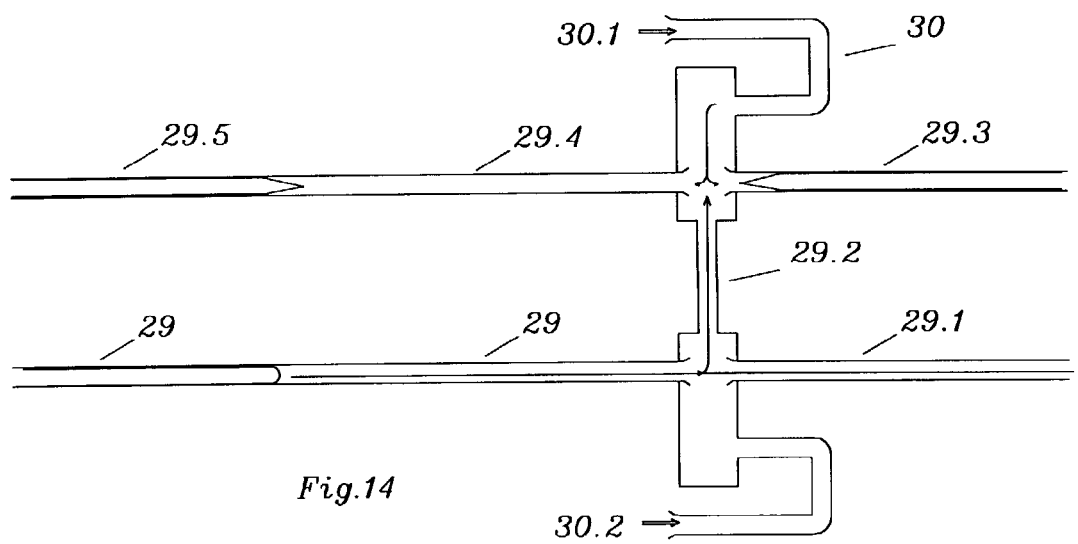
FIG. 14 shows induction pressure can be increased by modifying tuning fork assemblies into ram air tubes 30 opening into air flow of a moving vehicle 30.1 & 30.2, increases vacuum break pressure in cross over tube 29.2, traveling down 29.4 to forcefully induct overscavenge 29.5.
Figure 15:
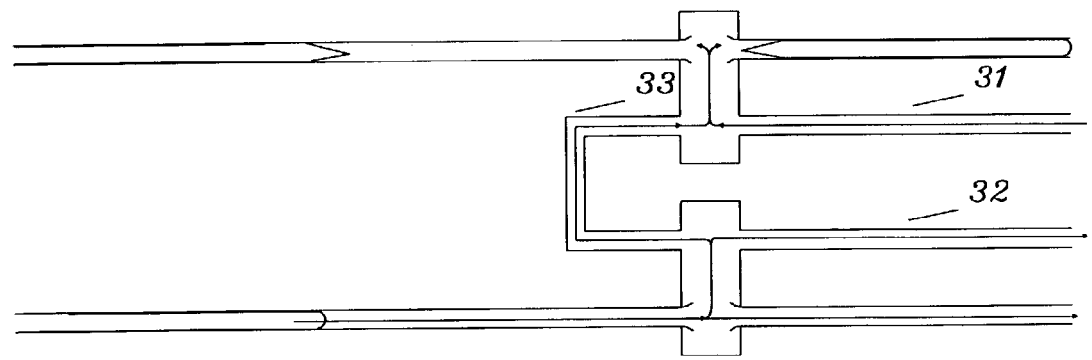
FIG. 15 shows how the length of vacuum air break chamber tubes 31 & 32 can act to create resonant pressure waves similar to the resonant mode of a tuning fork. Cross over tube 33 length and diameter can add desired tones to exhaust note. Cross over tube 33 can also add an alternative resonant mode with that of tubes 31 & 32.
Figure 16:
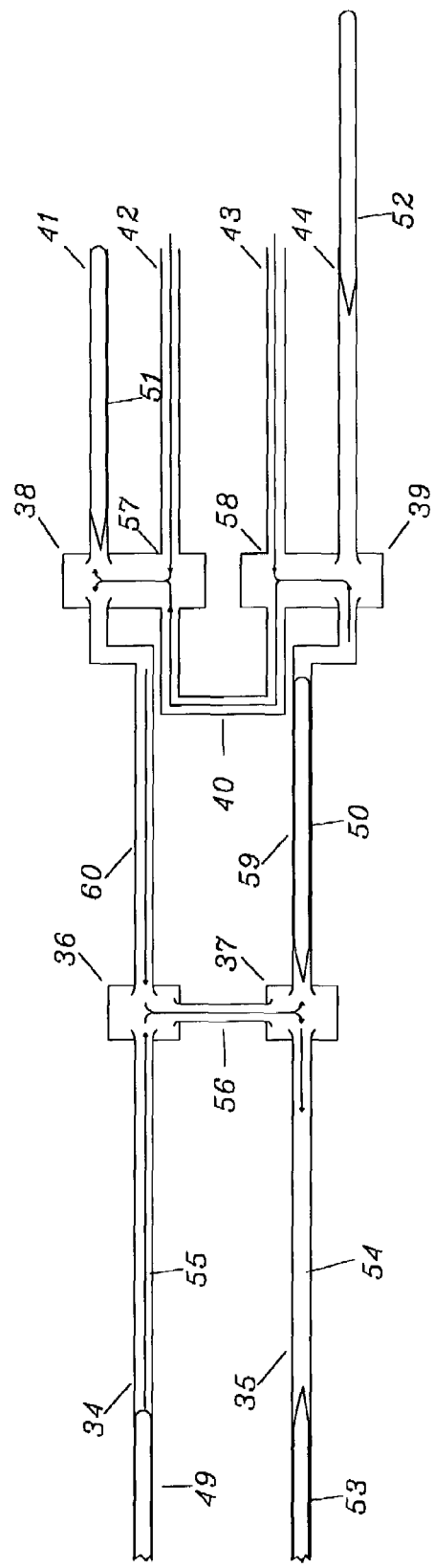
FIG. 16 shows how combined air break chambers 36 & 37, installed between engine exhaust port pipes 34 & 35, changes the chambers 38 & 39 into boost chambers. The added multi mode resonance of the twin tuning fork tubes 41 & 42, and 43 & 44, adding the pressure wave 55 created by exhaust pulse 49, combined with pressure wave 58 created by exhaust pulse 50 through the tuned cross over tube 40 allow greater induction of atmospheric air into induction exhaust system, to increase pressure 56 and resulting forced induction of overscavenge 53 by pressure wave 54.

In another embodiment of the invention, FIG. 16, a vacuum break chamber 36 & 37 is installed between the engine exhausts 34 & 35 and what are now boost chambers 38 & 39, connected by cross over tube 40. When the vacuum break chamber is moved closer to the engine, the exhaust pulse travels a shorter distance before the rarified condition behind it is relieved, meaning that less overscavenge is pulled from the engine, and less time is required for induction, which means that a higher rpm engine could benefit from an induction exhaust with a closer vacuum break chamber. Less overscavenge induction volume could mean slightly less power at low rpm.

But, the bigger benefit from adding a vacuum break chamber to the two chamber system shown in FIG. 17 is that chambers 38 & 39 become boost chambers that help to use otherwise wasted exhaust pulse energy to create pressure to better force induction of overscavenge and even atmospheric air into the combustion chamber of said engine.

To better illustrate the high rpm function of this embodiment, FIG. 16 shows four exhaust pulses within the system; in order of occurrence, the first 52 exiting tuned pipe 44, second 51 traveling through tuned pipe 41, third 50 traveling through pipe 59, and the most recent exhaust pulse 49 entering pipe 34. The only overscavenge 53, present in the system is entering pipe 35. As exhaust pulse 50 clears vacuum break 37, higher pressure is allowed to push overscavenge 53 and free radicals 54 back into the exhaust port and cylinder from which it came. Higher pressure is also allowed to relieve the low pressure wave drag upon exhaust pulse 50, allowing it to conserve its kinetic energy. As higher pressure air escapes from vacuum break chamber 37, it is replaced by air coming from vacuum break chamber 36 via tube 56. Said vacuum break chamber 36 is pressure charged from both advancing exhaust pulse 55 in tube 34, and by the pressure wave created by exhaust pulse 50 in tube 59, traveling through boost chamber 39, tuned cross over tube 40, boost chamber 38, tube 60 flowing into said vacuum break chamber 36. Air pressure escape is blocked in boost chamber 39 by exhaust pulse 52 in tube 44, and by a resonant standing wave pressure front in tube 43 at 58. Boost chamber 38 is likewise sealed by exhaust pulse 51 in tube 41 and a resonant standing wave pressure front in tube 42 at 57.

In summary, regarding induction exhaust, overscavenge induction; 1) exhaust pulse scavenge is allowed to sweep said engine combustion chamber clean & to initiate air fuel induction for the subsequent intake stroke 53 & 54, 2) when the exhaust pulse passes a vacuum break chamber 37, higher pressure air flows in front of the advancing scavenge flow separating overscavenge 54 from energetic exhaust pulse matter 50, 3) higher pressure air effectively reverses the outward flow of overscavenged free radicals and unburned air fuel, forcing such overscavenge to ultimately be inducted into said exhaust port, 4) such materials inducted during valve overlap form a layering of such matter on the piston surface as said piston recedes on its intake stroke (FIG. 6 item 10), and 5) induction exhaust function ends when the exhaust valve closes and induction continues solely through conventional intake induction (not shown).

In summary, regarding induction exhaust, conservation of energy; 1) exhaust pulse head pressure 55 is reduced due to vacuum break chamber 36 via tube 56 to low pressure wave in vacuum break chamber 37, 2) exhaust pulse rarefaction wave drag 54 is reduced when exhaust pulse 50 passes through vacuum break chamber 37 and such low pressure wave is relieved by higher pressure air flowing from tube 56, 3) exhaust pulse 50 head pressure is relieved into boost chamber 39, through tuned cross over tube 40, through boost chamber 38, flowing into said tube 60, 4) exhaust pulse 52 is pushed by said pressure wave in boost chamber 39, and 5) exhaust pulse 51 is pushed by said pressure wave in boost chamber 38.

Internal combustion engine thermal efficiency gains are more likely to be found in herein described induction exhaust method; recovering wasted exhaust cycle energy and using it to supplement the anemic internal combustion engine intake cycle. Approximately 70% of combustion energy in a gasoline, internal combustion engine is spewed out the exhaust cycle. Yet, in a typical 200 horsepower gasoline engine; for each horsepower used to compress air fuel into the combustion chamber, about 20 horse power is returned at the crankshaft. A turbo charger is the classic example of this process of converting waste exhaust energy into increased induction of air and fuel, without removing power from the crankshaft. The preferred embodiments uses some portion of the normally wasted exhaust energy to capture and force free radicals, unburned air fuel and atmospheric air, into the exhaust port and combustion chamber to increase combustion chamber pressures and thermal efficiency, while reducing all emissions. Herein described induction exhaust system is an improvement over a turbo charger in that it has the potential to 1) offer superior low rpm torque, 2) use no moving parts (in its simplest form), 3) be lighter in weight, 4) offer superior fuel efficiency, 5) reduce emissions, and 6) be vastly less expensive in terms of initial cost and maintenance.

The invention may be embodied in other specific forms without departing from its spirit or essential characteristics. The described embodiments are to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. An exhaust apparatus for an internal combustion engine for inducting combustible matter into an internal combustion chamber of the internal combustion engine via an exhaust port of the internal combustion chamber, said internal combustion engine having at least a first and a second exhaust port, the apparatus comprising:
(a) a first vacuum break chamber having at least two engine-side connections and at least two opposite-engine-side connections, and a second and a third vacuum break chamber, each having at least an engine-side connection and at least two opposite-engine-side connections;
(b) at least one of the first, second and third vacuum break chambers being arranged so as to capture and re-induct to the internal combustion chamber an exhaust flow comprising at least one of the following;
  i) unburned air fuel mixture;
  ii) unburned fuel;
  iii) partly burned fuel;
  iv) energetic free radicals of at least one of $NO_X$, $CO_X$, $HO^-$, $H^+$, $C_NH_{2N-X}$, $CN$, $CN-R$, $C_NH_{2N+1}OH$, $N_X^-$, $SO_X-$ and $H_2O$;
(c) first and second exhaust pipes, flow connected from said first and second an exhaust ports respectively to an engine-side connection of the first vacuum break chamber;
(d) a third exhaust pipe flow connected from an opposite-engine-side connection of the first vacuum break chamber to the engine-side connection of the second vacuum break chamber;
(e) a fourth exhaust pipe flow connected from an opposite-engine-side connection of the first vacuum break chamber to the engine-side connection of the third vacuum break chamber;
(f) a first pair of discharge/induction pipes, each pipe having a proximal end and a discharge/induction end, the proximal ends each flow connected to an opposite-engine-side connection of the second vacuum break chamber;
(g) a second pair of discharge/induction pipes, each having a proximal end and a discharge/induction end, the proximal ends each flow connected to an opposite-engine-side connection of the third vacuum break chamber;

(h) a catalytic converter flow connected within the third exhaust pipe; and (i) a catalytic converter flow connected within the fourth exhaust pipe.

2. An exhaust apparatus for an internal combustion engine for inducting combustible matter into an internal combustion chamber of the internal combustion engine via an exhaust port of the internal combustion chamber, the apparatus comprising:

(a) a first vacuum break chamber and a second vacuum break chamber, each having an engine-side connection and two opposite-engine-side connections;

(b) at least one of the first and second vacuum break chamber arranged so as to capture and re-induct to the internal combustion chamber an exhaust flow comprising at least one of the following:
  i) unburned air fuel mixture;
  ii) unburned fuel;
  iii) partly burned fuel;
  iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;

(c) a first exhaust pipe flow connected to an engine exhaust port and to the engine-side connection of the first vacuum break chamber, and a second exhaust pipe flow connected to the engine exhaust port and to the engine-side connection of the second vacuum break chamber;

(d) a first pair of discharge/induction pipes, each having a proximal end and a discharge/induction end, the proximal ends of said first pair being flow connected to the two opposite-engine-side connections of the first vacuum break chamber and to the atmosphere, and a second pair of discharge/induction pipes, each having a proximal end and a discharge/induction end, the proximal ends of said second pair being flow connected to the two opposite-engine-side connections of the second vacuum break chamber; and (e) a cross-over pipe flow connecting said engine-side connection of said first vacuum break chamber to said engine-side connection of said second vacuum break chamber.

3. An exhaust apparatus for inducting combustible matter into an internal combustion chamber of an internal combustion engine via an exhaust port of the internal combustion chamber, the apparatus comprising:

(a) a first vacuum break chamber having an engine-side connection and two opposite-engine-side connections, and a second vacuum break chamber having two engine-side connections and two opposite engine-side connections;

(b) at least one of the first and second vacuum break chamber arranged so as to capture and re-induct to the internal combustion chamber an exhaust flow comprising at least one of the following:
  i) unburned air fuel mixture;
  ii) unburned fuel;
  iii) partly burned fuel;
  iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;

(c) a first exhaust pipe flow connected to all the exhaust ports of the engine and flow connected to an engine-side-connection of the first vacuum break chamber;

(d) a hollow resonator chamber having an open end, said open end flow connected to the engine-side connection of the first vacuum break chamber;

(e) second and third exhaust pipes flow connected from the first vacuum break chamber's opposite-engine side connections to the second vacuum break chamber's engine-side connections respectively; and (f) a pair of discharge/induction pipes, each having a proximal end and a discharge/induction end, the proximal ends flow connected to the opposite-engine-side connections respectively of the second vacuum break chamber; said pair of discharge/induction pipes being of equal length.

4. An exhaust apparatus for inducting combustible matter into an internal combustion chamber of an internal combustion engine via exhaust ports of the internal combustion chamber, the apparatus comprising:

(a) a first vacuum break chamber and a second vacuum break chamber, each having first and second engine-side connections and first and second opposite-engine-side connections;

(b) at least one of the first and second vacuum break chambers being arranged so as to capture and re-induct to the internal combustion chamber an exhaust flow comprising at least one of the following:
  i) unburned air fuel mixture;
  ii) unburned fuel;
  iii) partly burned fuel;
  iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;

(c) a "Y" flow adapter, having a single engine-side connection and first and second opposite-engine-side connections;

(d) a first exhaust pipe flow connected from the exhaust ports to the to the engine-side connection of the flow adapter;

(e) a second exhaust pipe flow connected from the first opposite-engine-side connection of the adapter to a first engine-side connection of the second vacuum break chamber;

(f) a third exhaust pipe flow connected from the second opposite-engine-side connection of the adapter to an engine-side connection of the second vacuum break chamber;

(g) a cross-over pipe flow connected between the second engine-side connections of the first and second vacuum break chambers;

(h) a first pair of discharge/induction pipes, each having a proximal end and a discharge/induction end, the first pair proximal ends being flow connected to the first and second opposite-engine-side connections respectively of the first vacuum break chamber;

(i) a second pair of discharge/induction pipes, each having a proximal end and a discharge/induction end, the second pair proximal ends being flow connected to the opposite-engine-side connections respectively of the second vacuum break chamber; and (j) at least one catalytic converter flow connected between at least one of said engine exhaust ports and said first vacuum break chamber and said second vacuum break chamber.

5. An exhaust apparatus for inducting combustible matter into an internal combustion chamber of an internal combustion engine via exhaust ports of the internal combustion chamber, the apparatus comprising:

(a) at least one of the first and second vacuum break chambers arranged so as to capture and re-induct to the internal combustion chamber an exhaust flow comprising at least one of the following:
  i) unburned air fuel mixture;
  ii) unburned fuel;
  iii) partly burned fuel;
  iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;
(b) at least one exhaust pipe flow connecting said exhaust ports to said vacuum break chamber;
(c) at least two discharge/induction pipes, each having a proximal end and a discharge/induction end, the proximal end flow connected to said vacuum break chamber; and
(d) a resonator chamber flow connected to the vacuum break chamber, where the length and volume of the resonator chamber are such that the apparatus inducts said matter due to an instant storage of incoming acoustic forces or resonance energies in the resonator chamber first as sound pressure, then by conversion of such pressure into flow velocity toward said exhaust port.

6. An exhaust apparatus for inducting combustible matter into an internal combustion chamber of an internal combustion engine via exhaust ports of the internal combustion chamber, the apparatus comprising:
  (a) a first vacuum break chamber having an engine-side connection and first and second opposite-engine-side connections, and a second vacuum break chamber having first and second engine-side connections and first and second opposite engine-side connections;
  (b) at least one of the first and second vacuum break chambers being arranged so as to capture and re-induct to the internal combustion chamber an exhaust flow comprising at least one of the following:
    i) unburned air fuel mixture;
    ii) unburned fuel;
    iii) partly burned fuel;
    iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;
  (c) a first exhaust pipe flow connected to all the exhaust ports of the engine and flow connected to the engine-side-connection of the first vacuum break chamber;
  (d) a hollow resonator chamber having an open end, said open end flow connected to the engine-side connection of the first vacuum break chamber;
  (e) second and third exhaust pipes flow connected from the first vacuum break chamber's first and second opposite-engine side connections respectively to the second vacuum break chamber's first and second engine-side connections respectively; and
  (f) a pair of discharge/induction pipes, each having a proximal end and a discharge/induction end, the proximal ends flow being connected to the first and second opposite-engine-side connections of the second vacuum break chamber.

7. An exhaust apparatus for inducting combustible matter into an internal combustion chamber of an internal combustion engine via exhaust ports of the internal combustion chamber, the apparatus comprising:
  (a) a first vacuum break chamber and a second vacuum break chamber, each having first and second engine-side connections and first and second opposite-engine-side connections;
  (b) at least one of said first and second vacuum break chamber arranged so as to capture and re-induct to the internal combustion chamber an exhaust flow comprising at least one of the following:
    i) unburned air fuel mixture;
    ii) unburned fuel;
    iii) partly burned fuel;
    iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;
  (c) a "Y" flow adapter, having an engine-side connection and first and second opposite-engine-side connections;
  (d) a first exhaust pipe flow connected from the exhaust ports to the to the engine-side connection of the flow adapter;
  (e) a second exhaust pipe flow connected from the first opposite-engine-side connection of the adapter to the first engine-side connection of the second vacuum break chamber;
  (f) a third exhaust pipe flow connected from the second opposite-engine-side connection of the adapter to the first engine-side connection of the second vacuum break chamber;
  (g) a cross-over pipe flow connected between engine-side connections of the first and second vacuum break chambers;
  (h) a first pair of discharge/induction pipes, each having a proximal end and a discharge/induction end, the first pair proximal ends flow connected to the opposite-engine-side connections of the first vacuum break chamber respectively; and
  (i) a second pair of discharge/induction pipes, each having a proximal end and a discharge/induction end, the second pair proximal ends flow connected to the opposite-engine-side connections of the second vacuum break chamber respectively.

8. The apparatus according to claim 7, wherein the adapter comprises a third vacuum break chamber having an engine side and an opposite-engine side, and the apparatus further comprises a resonator chamber flow connected to the engine side of said third chamber.

9. An exhaust apparatus for inducting combustible matter into an internal combustion chamber of an internal combustion engine via at least first and second exhaust ports of the internal combustion chamber, the apparatus comprising:
  (a) a first vacuum break chamber and a second vacuum break chamber, each having an engine-side connection and two opposite-engine-side connections;
  (b) at least one of the first and second vacuum break chambers being arranged so as to capture and re-induct to the internal combustion chamber an exhaust flow comprising at least one of the following:
    i) unburned air fuel mixture;
    ii) unburned fuel;
    iii) partly burned fuel;
    iv) energetic free radicals of at least one of $NO_X$, $CO_X$, $HO^-$, $H^+$, $C_NH_{2N-X}$, CN, CN—R, $C_NH_{2N+1}OH$, $N_X^-$, $SO_X$— and $H_2O$;
  (c) a first exhaust pipe flow connected to at least said first exhaust port and to the engine-side connection of the first vacuum break chamber, and a second exhaust pipe flow connected to at least said second exhaust port and to the engine-side connection of the second vacuum break chamber;
  (d) a first pair of discharge/induction pipes, each having a proximal end and a discharge/induction end, the first pair proximal ends being flow connected to the two opposite-engine-side connections respectively of the first vacuum break chamber and to the atmosphere, and a second pair of discharge/induction pipes, each having a proximal end and a discharge/induction end, the second pair proximal ends being flow connected to the two opposite-engine-side connections respectively of the second vacuum break chamber.

10. The apparatus according to claim 9, wherein the discharge/induction end of one pipe of each of the first and second pairs of discharge/induction pipes is flow connected to a source of gas that has a pressure above surrounding atmospheric air pressure, and the discharge/induction end of the other pipe of each pair of discharge/induction pipes to open to the atmosphere.

11. An exhaust apparatus for inducting combustible matter into an internal combustion chamber of an internal combustion engine via at least one exhaust port of the internal combustion chamber, the apparatus comprising:
(a) a first vacuum break chamber having at least two engine-side connections and at least two opposite-engine-side connections, and second and third vacuum break chambers, each having at least an engine-side connection and at least two opposite-engine-side connections;
(b) at least one of said first and second vacuum break chambers being arranged so as to capture and re-induct to the internal combustion chamber an exhaust flow comprising at least one of the following:
 i) unburned air fuel mixture;
 ii) unburned fuel;
 iii) partly burned fuel;
 iv) energetic free radicals of at least one of $NO_X$, $CO_X$, $HO^-$, $H^+$, $C_NH_{2N-X}$, $CN$, $CN\text{---}R$, $C_NH_{2N+1}OH$, $N_X^-$, $SO_X\text{---}$ and $H_2O$;
(c) first and second exhaust pipes, each being flow connected from at least one of said exhaust ports to at least two engine-side connections of the first vacuum break chamber;
(d) a third exhaust pipe flow connected from an opposite-engine-side connection of the first vacuum break chamber to the engine-side connection the second vacuum break chamber;
(e) a fourth exhaust pipe flow connected from an opposite-engine-side connection of the first vacuum break chamber to the engine-side connection of the third vacuum break chamber;
(f) a first pair of discharge/induction pipes, each pipe having a proximal end and a discharge/induction end, the first pair proximal ends each flow connected to an opposite-engine-side connection of the second vacuum break chamber; and
(g) a second pair of discharge/induction pipes, each having a proximal end and a discharge/induction end, the second pair proximal ends each flow connected to an opposite-engine-side connection of the third vacuum break chamber.

12. An exhaust apparatus for inducting combustible matter into a combustion chamber of an internal combustion engine through at least one exhaust port of the internal combustion engine, the apparatus comprising:
(a) at least one vacuum break chamber arranged such that it captures and re-inducts to the internal combustion chamber an exhaust flow comprising at least one of the following:
 i) unburned air fuel mixture;
 ii) unburned fuel;
 iii) partly burned fuel;
 iv) energetic free radicals of at least one of $NO_X$, $CO_X$, $HO^-$, $H^+$, $C_NH_{2N-X}$, $CN$, $CN\text{---}R$, $C_NH_{2N+1}OH$, $N_X^-$, $SO_X\text{---}$ and $H_2O$;
(b) an exhaust pipe flow connecting at least one of said exhaust ports to said vacuum break chamber; and
(c) a discharge pipe exhaust gas flow aligned with said exhaust pipe on opposite sides of said vacuum chamber and having a proximal end and a discharge end with the proximal end flow connected to said vacuum break chamber; and
(d) an induction pipe flow connected to said chamber so as not to be exhaust gas flow aligned with said exhaust pipe and open at one end thereof to atmospheric air so as to allow air to flow into said chamber during use to break vacuums therein.

13. The apparatus according to claim 12, further comprising:
(a) at least one catalytic converter flow connected between a respective engine exhaust port and said first vacuum break chamber.

14. The exhaust apparatus according to claim 12, wherein the vacuum break chamber comprises a surface that allows heating of said matter above atmospheric temperature.

15. The exhaust apparatus according to claim 12, wherein the vacuum break chamber comprises a surface that allows cooling of said matter below exhaust gas temperature at the exhaust port.

16. The exhaust apparatus according to claim 12, wherein the vacuum break chamber is arranged such as to allow induction of said matter into the internal combustion chamber under a pressure greater than that found in said exhaust port.

17. The exhaust apparatus according to claim 12, wherein the vacuum break chamber is arranged such as to allow induction of said matter due to the instant storage of incoming inertia as pressure, then conversion of said pressure into flow velocity back toward a respective port.

18. The exhaust apparatus according to claim 12, wherein the exhaust pipe has a diameter and length such that the apparatus inducts said matter due to the instant storage of an incoming standing or traveling wave as acoustic pressure in the vacuum break chamber and conversion of such pressure into flow velocity back toward a respective exhaust port.

19. The exhaust apparatus according to claim 12, wherein the exhaust pipe is aligned with the discharge pipe in such a way as to create a digital pulse wave to induct said matter to a respective port.

20. An exhaust system for an internal combustion engine having at least one exhaust port, said system comprising:
(a) a vacuum break chamber, having at least one engine-side connection and first and second opposite-engine-side connections;
(b) an exhaust pipe flow connected between an engine exhaust port and the engine-side connection of the vacuum break chamber;
(c) a discharge pipe having a proximal end and a discharge end with the proximal end flow connected to the first opposite-engine-side connection of the vacuum break chamber and aligned with the engine side connection so as to receive flow of exhaust gases therefrom during operation; and
(d) an induction pipe connected to said chamber second opposite-engine-side connection so as not to be aligned with flow of gases through said chamber during operation; said induction pipe being connected to an source of gas outside of said chamber so as to allow flow of gas into said chamber to break vacuums created therein during.

21. The system according to claim 20 wherein said induction pipe opens into ambient air and such air is said outside source of gas.

22. The system according to claim 20 wherein said induction pipe opens into another exhaust system so as to provide said outside source of gas.

23. An exhaust apparatus for producing sequentially timed, alternating flow condition events presented to an internal combustion engine having a least one exhaust port, comprising:
   (a) a vacuum break chamber arranged such as to generate an initial low pressure condition event period in an exhaust port of said engine and further to generate a subsequent higher gas-pressure condition event period that limits and reduces overscavenge of raw, unburned air and fuel from said exhaust port and inducts said overscavenge of raw, unburned air and fuel back into said port; said vacuum break including a flow connection to a source of gas, outside of said exhaust apparatus so as to allow said gas to break vacuums in said chamber during usage.

24. The exhaust apparatus according to claim 21, wherein the subsequent higher gas-pressure condition event inducts free radicals and partially burned combustion products from previous exhaust events back into said port.

25. The exhaust apparatus according to claim 22, wherein the subsequent higher gas-pressure condition event inducts fresh atmospheric air into said port.

26. The exhaust apparatus according to claim 22, wherein the subsequent higher gas-pressure condition event inducts fresh matter composed of any one ore more of fuel, oxidizer, and catalyst substances into said port.

27. The exhaust apparatus according to claim 22, wherein the subsequent higher gas-pressure condition event inducts substances that affect exhaust emissions into said port.

28. In an internal a combustible engine exhaust system having an exhaust pipe with a first end adapted to be connected to at least one exhaust port of the engine and having a second end; the system comprising:
   a) a vacuum break chamber flow connected at an inlet on a first side thereof to said exhaust pipe second end and having an outlet on a second side thereof generally flow aligned with and adapted to receive exhaust gases from said vacuum break chamber inlet;
   b) a discharge pipe having first and second ends; said discharge pipe being connected to said vacuum break chamber outlet so as to be adapted to receive the exhaust gases therefrom; said discharge pipe second end adapted to discharge into the atmosphere; and
   c) said vacuum break chamber including an air inlet that is positioned so as to be unaligned with the passage of exhaust gases through said vacuum break chamber such that during usage air is drawn into said vacuum break chamber through said air inlet when a vacuum exists within the vacuum chamber so as to break the vacuum.

29. In an internal combustion engine exhaust system having at least first and second exhaust pipes that are each adapted to be connected at one end thereof to at least one exhaust port of the engine and each having a second end; the improvement comprising:
   a) first and second vacuum break chambers each flow connected on a first side thereof to said first and second exhaust pipe second ends respectively; each of said vacuum break chambers having a discharge outlet on a second side of said chamber flow aligned so as to be adapted to receive exhaust gases from said exhaust pipe; each of said vacuum break chambers having a cross over connection;
   b) first and second discharge pipes each having first and second ends; each of said discharge pipes being connected to a respective vacuum break chamber discharge outlet so as to be adapted to receive the exhaust gases therefrom; each of said discharge pipes having a second end adapted to discharge into the atmosphere; and
   c) a cross over tube flow connecting each of said vacuum break chambers between said cross over connections; said cross over connections being located so as to be out of the path of flow of exhaust gases between respective exhaust pipes and discharge pipes and operably allowing flow of gas from one of the vacuum break chambers to another of the vacuum break chambers wherein a vacuum exists so as to break such vacuum.

* * * * *